(12) United States Patent
Tullis et al.

(10) Patent No.: US 11,338,552 B2
(45) Date of Patent: May 24, 2022

(54) COMPOSITE MATERIALS, VEHICLE APPLICATIONS AND METHODS THEREOF

(71) Applicants: Productive Research LLC, West Bloomfield, MI (US); Material Sciences Corporation, Canton, MI (US)

(72) Inventors: Bryan Joseph Tullis, South Lyon, MI (US); Peter Isaac Bortell, Tecumseh, MI (US)

(73) Assignee: PRODUCTIVE RESEARCH LLC, West Bloomfield, MI (US)

( * ) Notice: Subject to any disclaimer, the term of this patent is extended or adjusted under 35 U.S.C. 154(b) by 0 days.

(21) Appl. No.: 16/792,232

(22) Filed: Feb. 15, 2020

(65) Prior Publication Data

US 2020/0262182 A1 Aug. 20, 2020

Related U.S. Application Data

(60) Provisional application No. 62/806,359, filed on Feb. 15, 2019.

(51) Int. Cl.
| | | |
|---|---|---|
| *B32B 15/085* | (2006.01) | |
| *B32B 15/18* | (2006.01) | |
| *B32B 27/32* | (2006.01) | |
| *B32B 27/20* | (2006.01) | |
| *B32B 7/02* | (2019.01) | |

(52) U.S. Cl.
CPC .............. *B32B 15/085* (2013.01); *B32B 7/02* (2013.01); *B32B 15/18* (2013.01); *B32B 27/20* (2013.01); *B32B 27/32* (2013.01); *B32B 2262/02* (2013.01); *B32B 2262/103* (2013.01); *B32B 2270/00* (2013.01); *B32B 2307/54* (2013.01); *B32B 2605/00* (2013.01)

(58) Field of Classification Search
CPC ........... B32B 7/00–7/14; B32B 15/08–15/098; C08L 23/00–23/36
See application file for complete search history.

(56) References Cited

U.S. PATENT DOCUMENTS

| | | | |
|---|---|---|---|
| 213,015 | A | 3/1879 | Wahl et al. |
| 777,656 | A | 12/1904 | Banning |
| 1,972,835 | A | 9/1934 | Tainton |
| 2,286,980 | A | 6/1942 | Schanz |
| 3,086,899 | A | 4/1963 | Smith et al. |
| 3,112,213 | A | 11/1963 | Lusa |
| 3,205,337 | A | 9/1965 | Hiemenz |

(Continued)

FOREIGN PATENT DOCUMENTS

| | | |
|---|---|---|
| CA | 1182004 A | 2/1985 |
| CA | 1290533 C | 10/1991 |

(Continued)

OTHER PUBLICATIONS

"Calcium Carbonate". Cameo Chemicals, Retrieved May 22, 2021.*

(Continued)

*Primary Examiner* — Prashant J Khatri
(74) *Attorney, Agent, or Firm* — The Dobrusin Law Firm, P.C.; Terry M. Finerman

(57) ABSTRACT

The teachings herein relate to improved composite materials offering weight reduction which are capable of withstanding automotive paint bake ovens.

17 Claims, 2 Drawing Sheets

(56) References Cited

U.S. PATENT DOCUMENTS

| | | |
|---|---|---|
| 3,527,667 A | 9/1970 | Larsen et al. |
| 3,764,277 A | 10/1973 | Hollis |
| 3,832,433 A | 8/1974 | Schaffer et al. |
| 3,873,643 A | 3/1975 | Wu et al. |
| 3,882,914 A | 5/1975 | Strutz |
| 3,900,651 A | 8/1975 | Hoppe et al. |
| 3,969,868 A | 7/1976 | Bainter et al. |
| 4,037,073 A | 7/1977 | Becker |
| 4,048,355 A | 9/1977 | Sakayori et al. |
| 4,110,117 A | 8/1978 | McLeod |
| 4,110,505 A | 8/1978 | Prewo |
| 4,171,394 A | 10/1979 | Patil et al. |
| 4,229,504 A | 10/1980 | Brachman |
| 4,255,482 A | 3/1981 | Udagawa |
| 4,267,679 A | 5/1981 | Thompson |
| 4,313,996 A | 2/1982 | Newman et al. |
| 4,329,561 A | 5/1982 | Schafer et al. |
| 4,330,587 A | 5/1982 | Woodbrey |
| 4,353,951 A | 10/1982 | Yukitoshi et al. |
| 4,369,222 A | 1/1983 | Hedrick et al. |
| 4,369,830 A | 1/1983 | Generali |
| 4,383,942 A | 5/1983 | Davenport |
| 4,421,892 A | 12/1983 | Kasahara et al. |
| 4,424,254 A | 1/1984 | Hedrick et al. |
| 4,429,076 A | 1/1984 | Saito et al. |
| 4,461,665 A | 7/1984 | Schertler |
| 4,474,685 A | 10/1984 | Annis |
| 4,482,600 A | 11/1984 | Matsumoto et al. |
| 4,513,033 A | 4/1985 | Patil et al. |
| 4,522,875 A | 6/1985 | Still, Jr. et al. |
| 4,601,941 A | 7/1986 | Lutz et al. |
| 4,617,231 A | 10/1986 | Hamada et al. |
| 4,650,723 A | 3/1987 | Furuya |
| 4,650,951 A | 3/1987 | Koga et al. |
| 4,668,545 A | 5/1987 | Lowe |
| 4,678,699 A | 7/1987 | Gregor et al. |
| 4,678,707 A | 7/1987 | Shinozaki et al. |
| 4,690,856 A | 9/1987 | Ito et al. |
| 4,749,623 A | 6/1988 | Endo et al. |
| 4,753,850 A | 6/1988 | Ibe et al. |
| 4,758,627 A | 7/1988 | Wilkus et al. |
| 4,759,972 A | 7/1988 | Yoshiga et al. |
| 4,759,994 A | 7/1988 | Lesourd |
| 4,788,099 A | 11/1988 | Fukushima et al. |
| 4,792,499 A | 12/1988 | Shindou et al. |
| 4,794,050 A | 12/1988 | Campbell et al. |
| 4,857,377 A | 8/1989 | Daimon et al. |
| 4,873,149 A | 10/1989 | Shinoda et al. |
| 4,888,247 A | 12/1989 | Zweben et al. |
| 4,937,125 A | 6/1990 | Lepoetre et al. |
| 4,942,193 A | 7/1990 | Van Buskirk et al. |
| 4,978,582 A | 12/1990 | Stamm et al. |
| 5,030,488 A | 7/1991 | Sobolev |
| 5,030,816 A | 7/1991 | Strecker |
| 5,047,479 A | 9/1991 | Ohmae et al. |
| 5,061,778 A | 10/1991 | Uchida et al. |
| 5,063,098 A | 11/1991 | Niwa et al. |
| 5,084,357 A | 1/1992 | Imai et al. |
| 5,093,204 A | 3/1992 | Watanabe et al. |
| 5,100,737 A | 3/1992 | Colombier et al. |
| 5,143,790 A | 9/1992 | Sattinger |
| 5,176,852 A | 1/1993 | Kondo et al. |
| 5,216,075 A | 6/1993 | Papazoglou |
| 5,219,629 A | 6/1993 | Sobolev |
| 5,227,216 A | 7/1993 | Pettit |
| 5,278,231 A | 1/1994 | Chundury |
| 5,347,099 A | 9/1994 | Gissinger et al. |
| 5,354,607 A | 10/1994 | Swift et al. |
| 5,410,133 A | 4/1995 | Matsein et al. |
| 5,418,073 A | 5/1995 | Loth et al. |
| 5,489,180 A | 2/1996 | Ichihara et al. |
| 5,518,836 A | 5/1996 | McCullough |
| 5,548,027 A | 8/1996 | Heucher et al. |
| 5,578,384 A | 11/1996 | Kingston |
| 5,604,033 A | 2/1997 | Arthurs et al. |
| 5,614,930 A | 3/1997 | Osborne et al. |
| 5,658,264 A | 8/1997 | Samson |
| 5,679,441 A | 10/1997 | Saelens et al. |
| 5,691,037 A | 11/1997 | McCutcheon et al. |
| 5,753,885 A | 5/1998 | Iwasa et al. |
| 5,778,813 A | 7/1998 | Kennedy |
| 5,814,395 A | 9/1998 | Soellaart-Roelofsen |
| 5,846,461 A | 12/1998 | Collins et al. |
| 5,866,215 A | 2/1999 | Karbhari |
| 5,866,868 A | 2/1999 | Hirane |
| 5,894,045 A | 4/1999 | Desrondiers |
| 5,916,469 A | 6/1999 | Scoles et al. |
| 5,939,213 A | 8/1999 | Bowden et al. |
| 5,939,512 A | 8/1999 | Gervasi et al. |
| 5,951,800 A | 9/1999 | Pettit |
| 6,004,650 A | 12/1999 | Schweizer |
| 6,012,493 A | 1/2000 | Remke et al. |
| 6,050,208 A | 4/2000 | Kennedy |
| 6,090,465 A | 7/2000 | Steele et al. |
| 6,099,055 A | 8/2000 | Hirota et al. |
| 6,126,865 A | 10/2000 | Haak et al. |
| 6,138,435 A | 10/2000 | Kocher et al. |
| 6,146,488 A | 11/2000 | Okada et al. |
| 6,177,173 B1 | 1/2001 | Nelson |
| 6,202,462 B1 | 3/2001 | Hansen et al. |
| 6,268,408 B1 | 7/2001 | Dispenza |
| 6,294,257 B1 | 9/2001 | Tsukakoshi et al. |
| 6,346,292 B1 | 2/2002 | Grubb et al. |
| 6,346,491 B1 | 2/2002 | DeAngelis et al. |
| 6,387,535 B1 | 5/2002 | Mantel |
| 6,428,905 B1 | 8/2002 | Behr et al. |
| 6,455,148 B1 | 9/2002 | Spears et al. |
| 6,465,110 B1 | 10/2002 | Boss et al. |
| 6,534,194 B2 | 3/2003 | Weihs et al. |
| 6,592,968 B1 | 7/2003 | Schmit et al. |
| 6,592,979 B1 | 7/2003 | DeTeresa |
| 6,659,518 B2 | 12/2003 | Ponsonnaille et al. |
| 6,673,468 B1 | 1/2004 | Behr et al. |
| 6,741,221 B2 | 5/2004 | Aisenbrey |
| 6,764,772 B2 | 7/2004 | Clyne et al. |
| 6,841,212 B2 | 1/2005 | Bicakci-Jenkins et al. |
| 6,841,252 B2 | 1/2005 | Kroes et al. |
| 6,861,156 B2 | 3/2005 | Palm |
| 6,865,805 B2 | 3/2005 | Dispenza et al. |
| 6,870,516 B2 | 3/2005 | Aisenbrey |
| 7,157,140 B1 | 1/2007 | Hoppe et al. |
| 7,261,932 B2 | 8/2007 | Kennedy |
| 7,316,838 B2 | 1/2008 | Aisenbrey |
| 7,390,564 B2 | 6/2008 | Yuasa et al. |
| 7,459,115 B2 | 12/2008 | Stadler et al. |
| 7,553,553 B2 | 6/2009 | Palumbo |
| 7,569,624 B2 | 8/2009 | Kolbe et al. |
| 7,592,388 B2 | 9/2009 | Wick et al. |
| 7,648,058 B2 | 1/2010 | Straza |
| 7,748,184 B1 | 7/2010 | Wheeler et al. |
| 7,833,630 B2 | 11/2010 | Sigler |
| 7,879,454 B2 | 2/2011 | Manicke |
| 7,927,708 B2 | 4/2011 | Mizrahi |
| 7,959,058 B1 | 6/2011 | Crane |
| 7,981,501 B2 | 7/2011 | Kwag et al. |
| 8,034,428 B2 | 10/2011 | Verhaeghe |
| 8,071,205 B2 | 12/2011 | Tsuchiya |
| 8,186,566 B2 | 5/2012 | Abramovici et al. |
| 8,216,658 B2 | 7/2012 | Rajabali |
| 8,308,225 B2 | 11/2012 | Owen et al. |
| 8,309,004 B2 | 11/2012 | Pinard |
| 8,328,971 B2 | 12/2012 | Kia et al. |
| 8,344,070 B2 | 1/2013 | Squire et al. |
| 8,397,976 B2 | 3/2013 | Abramovici et al. |
| 8,404,352 B2 | 3/2013 | Schwab et al. |
| 8,475,930 B2 | 7/2013 | Shoji et al. |
| 8,518,521 B2 | 8/2013 | Aso et al. |
| 8,450,842 B2 | 9/2013 | Mizrahi |
| 8,573,357 B1 | 11/2013 | Hibbs |
| 8,852,733 B2 | 10/2014 | Kwag et al. |
| 8,888,169 B2 | 11/2014 | Howe et al. |
| 8,889,263 B2 | 11/2014 | Rice |
| 9,005,768 B2 | 4/2015 | Mizrahi |
| 9,115,264 B2 | 8/2015 | Mizrahi et al. |

(56) References Cited

U.S. PATENT DOCUMENTS

| | | |
|---|---|---|
| 2002/0108678 A1 | 8/2002 | Montano et al. |
| 2002/0160180 A1 | 10/2002 | Yamamoto et al. |
| 2003/0064241 A1 | 4/2003 | Suzuki et al. |
| 2003/0082335 A1 | 5/2003 | Clyne et al. |
| 2003/0099857 A1 | 5/2003 | Nomura et al. |
| 2003/0162049 A1 | 8/2003 | De Muijnck et al. |
| 2004/0116602 A1 | 6/2004 | Botros |
| 2004/0209092 A1 | 10/2004 | Near |
| 2004/0222863 A1 | 11/2004 | Aisenbrey |
| 2004/0227688 A1 | 11/2004 | Aisenbrey |
| 2004/0233112 A1 | 11/2004 | Aisenbrey |
| 2004/0239578 A1 | 12/2004 | Aisenbrey |
| 2004/0244789 A1 | 12/2004 | Jentgens |
| 2004/0247927 A1 | 12/2004 | Kurz |
| 2005/0000947 A1 | 1/2005 | Sigler et al. |
| 2005/0001780 A1 | 1/2005 | Aisenbrey |
| 2005/0133575 A1 | 6/2005 | Gayden et al. |
| 2005/0140042 A1 | 6/2005 | Aisenbrey |
| 2005/0166956 A1 | 8/2005 | Aisenbrey |
| 2005/0181203 A1 | 8/2005 | Rawlings et al. |
| 2005/0204544 A1 | 9/2005 | Aisenbrey |
| 2005/0205712 A1 | 9/2005 | Aisenbrey |
| 2005/0206270 A1 | 9/2005 | Aisenbrey |
| 2005/0206289 A1 | 9/2005 | Aisenbrey |
| 2005/0206491 A1 | 9/2005 | Aisenbrey |
| 2005/0208251 A1 | 9/2005 | Aisenbrey |
| 2005/0208862 A1 | 9/2005 | Aisenbrey |
| 2005/0212161 A1 | 9/2005 | Aisenbrey |
| 2005/0212162 A1 | 9/2005 | Aisenbrey |
| 2005/0214553 A1 | 9/2005 | Yannetti et al. |
| 2005/0224280 A1 | 10/2005 | Aisenbrey |
| 2005/0244660 A1 | 11/2005 | Yuasa et al. |
| 2005/0271859 A1 | 12/2005 | Tuss |
| 2006/0003667 A1 | 1/2006 | Aisenbrey |
| 2006/0010807 A1 | 1/2006 | Whitley |
| 2006/0060296 A1 | 3/2006 | Sigler et al. |
| 2006/0060690 A1 | 3/2006 | Aisenbrey |
| 2006/0062977 A1 | 3/2006 | Sigler et al. |
| 2006/0071862 A1 | 4/2006 | Aisenbrey |
| 2006/0091887 A1 | 5/2006 | Aisenbrey |
| 2006/0134395 A1 | 6/2006 | Sigler et al. |
| 2006/0134449 A1 | 6/2006 | Sigler et al. |
| 2006/0134450 A1 | 6/2006 | Sigler et al. |
| 2006/0222869 A1 | 10/2006 | Cai et al. |
| 2006/0269701 A1 | 11/2006 | Gauriat et al. |
| 2006/0269738 A1 | 11/2006 | Kimberly |
| 2006/0286333 A1 | 12/2006 | Wang et al. |
| 2007/0062758 A1 | 3/2007 | Jensen et al. |
| 2007/0066756 A1* | 3/2007 | Poon .............. C08F 10/00 525/191 |
| 2007/0104966 A1 | 5/2007 | Calvez et al. |
| 2007/0184288 A1 | 8/2007 | Garamszegi et al. |
| 2007/0186614 A1 | 8/2007 | Pinard |
| 2007/0187469 A1 | 8/2007 | Chen et al. |
| 2007/0196637 A1 | 8/2007 | Good et al. |
| 2007/0295704 A1 | 12/2007 | Sigler et al. |
| 2008/0012389 A1 | 1/2008 | Mittermeier et al. |
| 2008/0032094 A1 | 2/2008 | Raghavendran |
| 2008/0036241 A1 | 2/2008 | Aisenbrey |
| 2008/0036251 A1 | 2/2008 | Endo et al. |
| 2008/0081149 A1 | 4/2008 | Fuerst et al. |
| 2008/0254310 A1 | 10/2008 | Palumbo et al. |
| 2008/0311363 A1 | 12/2008 | Haskett et al. |
| 2009/0020187 A1 | 1/2009 | Russell et al. |
| 2009/0142538 A1 | 6/2009 | Sigler et al. |
| 2009/0159034 A1 | 6/2009 | Katayama et al. |
| 2009/0226755 A1 | 9/2009 | Sigler et al. |
| 2009/0280348 A1 | 11/2009 | Patberg et al. |
| 2010/0035080 A1 | 2/2010 | Sigler et al. |
| 2010/0040902 A1 | 2/2010 | Mizrahi |
| 2010/0084380 A1 | 4/2010 | Tetzlaff et al. |
| 2010/0098929 A1 | 4/2010 | Dispenza |
| 2010/0196736 A1 | 8/2010 | Boger et al. |
| 2010/0233505 A1 | 9/2010 | Boger et al. |
| 2011/0049913 A1 | 3/2011 | Bernt et al. |
| 2011/0052910 A1 | 3/2011 | Gunnink |
| 2011/0162788 A1 | 7/2011 | Mizrahi |
| 2011/0188927 A1 | 8/2011 | Mizrahi |
| 2011/0200816 A1 | 8/2011 | Mizrahi et al. |
| 2012/115872 A1 | 8/2012 | Mizrahi et al. |
| 2012/0196138 A1 | 8/2012 | Botros et al. |
| 2013/0136944 A1 | 5/2013 | Mizrahi et al. |
| 2013/0281576 A1 | 10/2013 | Kobayashi et al. |
| 2014/0034233 A1 | 2/2014 | VanSwedent et al. |
| 2014/0162086 A1 | 6/2014 | Mizrahi |
| 2014/0286699 A1 | 9/2014 | Mizrahi |
| 2015/0328864 A1 | 11/2015 | Mizrahi et al. |
| 2016/0222999 A1 | 8/2016 | Mizrahi |
| 2016/0339674 A1 | 11/2016 | Mizrahi et al. |
| 2016/0339675 A1 | 11/2016 | Mizrahi |
| 2018/0029332 A1 | 2/2018 | Mizrahi et al. |
| 2018/0126700 A1 | 5/2018 | Mizrahi |
| 2018/0250914 A1 | 9/2018 | Mizrahi et al. |
| 2020/0001574 A1 | 1/2020 | Mizrahi et al. |

FOREIGN PATENT DOCUMENTS

| | | |
|---|---|---|
| CA | 2041560 A1 | 11/1991 |
| CA | 2389078 A1 | 5/2001 |
| CA | 2478937 A1 | 9/2003 |
| CA | 2509699 A1 | 7/2004 |
| CA | 2546109 A1 | 6/2005 |
| CA | 2064041 C | 7/2006 |
| CA | 2700549 A1 | 4/2009 |
| CA | 2729589 A1 | 2/2010 |
| CA | 2731111 A1 | 3/2010 |
| CA | 2842609 A1 | 2/2012 |
| CA | 2859630 A1 | 7/2013 |
| CH | 284305 | 7/1952 |
| CH | 287794 | 12/1952 |
| CH | 406580 | 1/1966 |
| CN | 1649724 A | 8/2005 |
| DE | 877057 | 5/1953 |
| DE | 1912948 | 10/1970 |
| DE | 1729057 | 6/1971 |
| DE | 3622781 A1 | 1/1988 |
| DE | 4019202 A1 | 12/1991 |
| DE | 4141343 A1 | 5/1993 |
| DE | 4307563 A1 | 9/1993 |
| DE | 4300283 A1 | 7/1994 |
| DE | 19633306 A1 | 10/1997 |
| DE | 19724361 A1 | 1/1998 |
| DE | 19740844 A1 | 3/1999 |
| DE | 19710706 A1 | 9/1999 |
| DE | 19919783 | 11/2000 |
| DE | 19926379 A1 | 12/2000 |
| DE | 10011589 A1 | 9/2001 |
| DE | 10240384 A1 | 3/2004 |
| DE | 102004022677 A1 | 5/2004 |
| DE | 202004015784 | 4/2005 |
| DE | 102006013529 A1 | 10/2006 |
| DE | 102006049014 A1 | 4/2008 |
| DE | 102006049015 A1 | 4/2008 |
| DE | 102012103793 A | 10/2013 |
| EP | 0019835 A1 | 12/1980 |
| EP | 0069401 | 1/1983 |
| EP | 0089435 A2 | 9/1983 |
| EP | 0032355 B1 | 5/1984 |
| EP | 0208443 | 6/1986 |
| EP | 0249442 A2 | 3/1987 |
| EP | 0311722 A1 | 7/1989 |
| EP | 0322947 B1 | 7/1989 |
| EP | 0335642 A2 | 10/1989 |
| EP | 0354521 A2 | 2/1990 |
| EP | 0356837 B1 | 3/1990 |
| EP | 0642920 A2 | 3/1995 |
| EP | 0888880 A1 | 1/1999 |
| EP | 1034920 | 9/2000 |
| EP | 1044796 A2 | 10/2000 |
| EP | 1095718 A1 | 5/2001 |
| EP | 1197323 A1 | 4/2002 |
| EP | 1491328 A1 | 12/2004 |
| EP | 1504892 A1 | 2/2005 |
| FR | 1245009 | 11/1960 |

(56) References Cited

FOREIGN PATENT DOCUMENTS

| | | |
|---|---|---|
| GB | 2062057 A | 5/1981 |
| GB | 2332875 A | 7/1999 |
| JP | 54-52182 A | 4/1979 |
| JP | 56132709 A | 10/1981 |
| JP | S57-34949 A | 2/1982 |
| JP | 57-077065 A | 5/1982 |
| JP | 58-142844 A | 8/1983 |
| JP | S58-142845 A | 8/1983 |
| JP | S58-180037 U | 12/1983 |
| JP | 59-145142 A | 8/1984 |
| JP | 60-068180 A | 4/1985 |
| JP | 60-201296 A | 10/1985 |
| JP | S61010445 A | 1/1986 |
| JP | 61029262 U | 7/1986 |
| JP | S63-242536 A | 10/1986 |
| JP | 61-290044 A | 12/1986 |
| JP | 62-151332 A | 7/1987 |
| JP | S62-187022 A | 8/1987 |
| JP | S62-286686 A | 12/1987 |
| JP | 63-27248 A | 2/1988 |
| JP | S63-193831 A | 8/1988 |
| JP | 01154876 A | 4/1989 |
| JP | H01-108207 A | 4/1989 |
| JP | 01-263043 A | 10/1989 |
| JP | 2050827 A | 2/1990 |
| JP | 02-231134 A | 9/1990 |
| JP | 02-235725 A | 9/1990 |
| JP | H02-297432 A | 12/1990 |
| JP | 03-193443 A | 8/1991 |
| JP | 04-077245 A | 3/1992 |
| JP | 04-094928 A | 3/1992 |
| JP | 04-127972 A | 4/1992 |
| JP | 04-282239 A | 7/1992 |
| JP | H04-229699 A | 8/1992 |
| JP | 05-039560 A | 2/1993 |
| JP | 05-039561 A | 2/1993 |
| JP | 5050553 A | 3/1993 |
| JP | 05-138802 A | 6/1993 |
| JP | 5-162237 A | 6/1993 |
| JP | 05-229054 A | 9/1993 |
| JP | 05-229055 A | 9/1993 |
| JP | 06-071806 A | 3/1994 |
| JP | 06-198802 A | 7/1994 |
| JP | 07-068701 A | 3/1995 |
| JP | 07-276557 A | 10/1995 |
| JP | 08-224827 A | 9/1996 |
| JP | 09-087528 A | 3/1997 |
| JP | 63-158242 A | 7/1998 |
| JP | 10-237313 A | 9/1998 |
| JP | H11-123790 A | 5/1999 |
| JP | H11-199707 A | 7/1999 |
| JP | 2000-263697 A | 9/2000 |
| JP | 2001-059187 A | 3/2001 |
| JP | 2011-192792 A | 7/2011 |
| JP | 2013-515613 A | 5/2013 |
| JP | 2013-519543 A | 5/2013 |
| KR | 10-2004-0102231 A | 12/2004 |
| NL | 8203423 A | 4/1984 |
| RU | 2149788 C1 | 5/2000 |
| WO | 1995/027975 A1 | 10/1995 |
| WO | 1999/029492 A1 | 6/1999 |
| WO | 1999/046461 A1 | 9/1999 |
| WO | 2000/013892 A1 | 3/2000 |
| WO | 2003/037970 A1 | 5/2003 |
| WO | 2007/061304 A1 | 5/2007 |
| WO | 2007/062061 A2 | 5/2007 |
| WO | 2008/118694 A1 | 10/2008 |
| WO | 2009/027480 A1 | 3/2009 |
| WO | 2009/043777 A2 | 4/2009 |
| WO | 2009/135786 A1 | 11/2009 |
| WO | 2010/021899 A1 | 2/2010 |
| WO | 2011/082128 A1 | 7/2011 |
| WO | 2011/100734 A1 | 8/2011 |
| WO | 2012/126923 A1 | 9/2012 |
| WO | 2013/062642 A1 | 5/2013 |
| WO | 2013/156166 A1 | 10/2013 |
| WO | 2013/164173 A1 | 11/2013 |
| WO | 2013/178698 A1 | 12/2013 |
| WO | 2014/009114 A1 | 1/2014 |
| WO | 2014/066569 A1 | 5/2014 |

OTHER PUBLICATIONS

"What is Carbon Fiber, Really?". Toray Chemical, https://www.torayca.com/en/aboutus/abo_001.html. Retrieved May 22, 2021.*

Specification of U.S. Appl. No. 61/377,599. Retrieved May 22, 2021.*

"MP, Tg, and Structure of Common Polymers". https://www.perkinelmer.com/CMSResources/Images/44-74863TCH_MPTGAndStructureOfCommonPolymers.pdf. Retrieved May 21, 2021.*

Maier et al. "Solubility parameters of ethene/1-octene random copolymers", Polymer Bulletin, 40, (1998); pp. 337-344.*

Gourdazi et al. "Calculation of Hildebrand Solubility Parameters of Some Polymers Using QSPR Methods Based on LS-SVM Technique and Theoretical Molecular Descriptors", Chinese Journal of Polymer Science vol. 32, No. 5, (2014); pp. 587-594.*

"The Effect of Electrical Resistance on Nugget Formation During Spot Welding", J.G. Kaiser, G.J. Dunn, and T.W. Eagar, Welding Research Supplement, Jun. 1982, pp. 167-s to 174-s.

Abstract for: Dunnand, M., et al., "USILIGHT: A cost effective solution to lighten cars", SAE Technical Paper Series, Apr. 3-6, 2006, pp. 1-10.

Abstract for: Guttman, H., et al. "Galfan—A new Coating for Automotive Tubing", SAE Technical Paper 860274, 1986.

Abstract for: Herrschaft, D. et al., "Galfan—A New Zinc-Alloy Coated Steel for Automotive Body Use", SAE Technical Paper 830517, 1983.

Abstract for: Murase, M., et al., "Development of vibration damping steel sheets for automobile oil pans", SAE Internation Congress and Exposition, Mar. 1-5, 1993; Paper No. 930023; Kawasaki Steel Corp.

Abstract for: Shimizu, T. et al., "Application of hot-dip Zn-6%A1-3%Mg Alloy Coated Steel Sheet to Automotive Body", SAE Technical Paper No. 2005-01-1330, SAE 2005 World Congress & Exhibition, Apr. 2005.

Abstract for: Welch, T. et al., "Cost and Performance Benefits for Laminated Steel Body", SAE Technical Paper 1999-01-1784, 1999.

Cambridge University, Department of Materials and Metallurgy, Newsletter (Cambridge Material Eyes), "The Gordon Laboratory, 2001," published Aug. 2001 (Issue 11), p. 2.

DiCello, J.A., "Steel-Polypropylene-Steel Laminate—A New Weight Reduction Material," SAE Congress and Exposition, Detroit, MI, Feb. 25-29, 1980.

Gunnink, J.W. GLARE: An Improved Damage Tolerance Material. Proc. 19th European Conference on materials for Aerospace Applications, Dec. 6-8, 2000, pp. 17-24.

Haward, R.N., "Strain Hardening of Thermoplastics," Macromolecules 1993, 26, 5860-5869.

Kim et al., "Formability of AA5182/polypropylene/AA5182 Sandwhich Sheets", J. of Mat. Processing Tech., 139 (2003) 1-7.

Kim et al., "Forming and Failure Behaviour of Coated, Laminated and Sandwiched Sheet Metals: A Review", J. of Mat. Processing Tech., 63 (1997) 38-42.

Link, Todd M. "Formability and Performance of Steel-Plastic Steel Laminated Sheet Materials", SAE 2001 World Congress, Detroit, MI, Mar. 5-8, 2001.

Markaki, A.E. and T.W. Clyne, "Mechanics of Thin Ultra-Light Stainless Steel Sandwich Sheet Material, Part I. Stiffness," Acta Materialia 51 (2003) 1341-1350.

Markaki, A.E. and T.W. Clyne, "Mechanics of Thin Ultra-Light Stainless Steel Sandwich Sheet Material, Part II. Resistance to Delamination," Acta Materialia 51 (2003) 1351-1357.

Markaki, A.E., S.A. Westgate, and T.W. Clyne, "The Stiffness and Weldability of an Ultra-Light Steel Sandwich shhet Maerial with a Fibrous Metal Core," In Processing and Properties of Lightweight Cellular Metals and Structures, TMS, 2002, pp. 15-24.

(56) References Cited

OTHER PUBLICATIONS

McKenna, L.W. et al., "New Light-Weight Materials for Vehicle Body Panels—Aluminum/Nylon Laminates," SAE Congress and Exposition, Detroit, MI, Feb. 25-29, 1980.

Miller, William K. "Metal-Plastic Laminates for Vehicle Weight Reduction," SAE Congress and Exposition, Detroit, MI, Feb. 25-29, 1980.

Mohr et al. Development of Formable Sandwich Sheets for Automotive Applications, Adv. Eng. Materials, 7 (2005) 243-246.

Mohr, Dirk, "On the Role of Shear Strength in Sandwich Sheet Forming," International Journal of Solids and Structures 42 (2005) 1491-1512.

Shelley, Tom, "Steel Makes Lightweight Fibre Sandwich," Sep. 2001. Downloaded from http://fplretlib.findlay.co.uk/articles/1311/n-sandwich.htm on Jun. 3, 2013.

Shinozaki et al. "Spot-Weldable Composite Damping Sheets" Kawasaki Steel Giho. vol. 16 =, No. 4 pp. 288-295, 1984. www.jfe~steel.co.jp/archives/ksc_giho/16-4/j16-288-295.pdf.

Sokolova, O. et al, "Metal-polymer-metal sandwiches with local metal reinforcements: A study on formability by deep drawing and bending," Composite Structures, 94 (2011) 1-7.

Weber, Mark and Musa R. Kamal, Polymer Composites, "Estimation of the Volume Resistivity of Electrically Conductive Composites"; Dated Dec. 1997, pp. 711-725.

Weiss et al. "The Influence on Temperature on the Forming Behavior of Metal/Polymer Laminates in Sheet Metal Forming", Transactions of the ASME, 129 ( 2007) 530-537.

Weiss, M. et al., "Elastic Bending of Steel-Polymer-Steel Laminates (SPS) to a Constant Curvature," Journal of Applied Mechanics (ASME), 2006. 73 (4): p. 574-579.

www.quietsteel.com/pressrelease-022003.html. MSC Engineered Materials and Solutions Group, "Quiet Steel™ Debuts on 2003 Cadillac (Feb. 20, 2003)".

Qingshan, Li chief Editor, The Chinese Textile Press, p. 86, Jan. 2009.

Bigg, Donald M., "Mechanical, Thermal, and Electrical Properties of Metal Fiber-Filled Polymer Composites" Dec. 1979, vol. 19, No. 16, DESC pp. 1-4.

\* cited by examiner

COMPOSITE MATERIALS, VEHICLE APPLICATIONS AND METHODS THEREOF

FIELD

The teachings herein are related to composite materials having one or more polymeric layer(s) interposed between two metallic layers. The thickness of the one or more polymeric layer is typically 30% to 92% of the combined thickness of the polymeric layer(s) and the metallic layers, so that weight reduction is achieved. Preferably, the composite material is capable of passing through automotive oven bake exposure without failure of the polymeric layers. The composite material preferably includes a highly viscous polymer and/or a polymer that adheres to the metallic layer. The composite material may be used in automotive components, particularly automotive components that will be painted and then exposed to one or more automotive oven bake cycles. The teachings herein are also related to vehicle components including the composite material, such as an automotive bumper and/or an automotive bumper fascia.

BACKGROUND

There have been many efforts to reduce the weight of automotive components and articles that are transported in order to reduce transportation and energy costs. These efforts typically rely on replacing a metal component with a material having reduced weight and/or changing the shape or profile of the part to reduce the amount of material required.

These efforts have included sandwich composite materials having a polymeric material interposed between metal layers. However, the selected polymeric material is often expensive and/or fails when exposed to typical automotive bake temperature. Failure can be a result of the polymeric material softening and/or melting, and then flowing between the metallic layers by the action of forces applied from the heated metallic layers or by gravity. Failure can be a result of the insufficient adhesion and/or loss of adhesion between the polymeric layer and the metallic layers. This may result in changes in the thickness, at one or more locations, of a component including the composite material and/or a change in the shape of the component.

In some efforts, the sandwich material includes a high concentration of metal material in the core layers and thus the weight reduction benefits of the composite material may be limited.

In some efforts, the polymeric layer has included hygroscopic polymers and long-term durability may be limited when the component is exposed to water and/or humidity. For example, the moisture may result in corrosion of the metal layer and/or a loss of adhesion between the metal layer and the polymeric layer.

In some efforts, the core has a structure that cannot be formed by low cost polymer processing methods and thus are difficult and/or expensive to process.

There is a need for composite materials having one or any combination of the following characteristics: a composite material having a highly viscous polymeric core; a composite material that is light weight; a composite material having a polymer layer that adheres to a metal layer; a composite material that maintains adhesion between a metal layer and a polymer layer during an automotive bake exposure; a composite material having a polymer layer that does not flow (e.g., flow out of an edge) during an automotive bake exposure; a composite material having durable adhesion between a polymeric layer and a metal layer; a composite material having adhesion between a polymeric layer and a metal layer after exposure to humidity; or a composite material having a polymeric layer that can be formed by polymer extrusion, polymer calendaring, or polymer thermoforming methods. Preferably, the composite material is capable of passing one or more requirements for automotive oven bake exposure. Preferably, the composite material has two or more, three or more, four or more, five or more, or all of the above characteristics.

SUMMARY

One or more of the aforementioned needs is achieved by the composite materials according to the teachings herein.

One aspect according to the teachings herein is directed at a composite material including a first steel layer; a second steel layer; and a polymeric core layer interposed between and attached to the first and second steel layers. The thickness of the polymeric core layer is about 0.1 mm or more (preferably about 0.2 mm or more, more preferably about 0.3 mm or more) and a ratio of the thickness of the polymeric core layer to a thickness of the composite material is about 0.20 or more (preferably about 0.25 or more, more preferably about 0.30 or more, and most preferably about 0.35 or more) to about 0.90 or less (preferably about 0.85 or less, more preferably about 0.80 or less, even more preferably about 0.70 or less, even more preferably about 0.60 or less and most preferably about 0.50 or less). The polymeric core layer includes one or more polymers and one or more fillers selected and arranged so that the polymeric core layer has a low shear flow value of about 0.04 g or less, as measured at 177° C. for 30 minutes with a mass of 0.91 kg on a 5.1 mm×5.1 mm specimen, preferably the mass is evenly distributed over the specimen. Preferably the polymeric core layer is characterized by a melt flow rate, measured at 190° C./2.16 kg, of about 2 g/10 min or less (preferably about 1.5 g/10 min or less, more preferably about 1.0 g/10 min or less, and even more preferably about 0.8 g/10 min or less). The thickness of the core may be about 4 mm or less, about 3.0 mm or less, about 2.0 mm or less, or about 1.0 mm or less.

Another aspect of the teachings herein is direct at a composite material comprising: a first steel layer having a tensile yield strength of 240 MPa or more and a thickness of about 0.55 mm or more; a second steel layer having a tensile yield strength of less than 220 MPa and a thickness of about 0.40 mm or less; and a polymeric core layer interposed between and attached to the first and second steel layers. The thickness of the polymeric core layer is about 0.1 mm or more (preferably about 0.2 mm or more, more preferably about 0.3 mm or more) and a ratio of the thickness of the polymeric core layer to a thickness of the composite material is about 0.20 or more (preferably about 0.25 or more, more preferably about 0.30 or more, and most preferably about 0.35 or more) to about 0.90 or less (preferably about 0.85 or less, more preferably about 0.80 or less, even more preferably about 0.70 or less, even more preferably about 0.60 or less and most preferably about 0.50 or less). The polymeric core layer includes or consists of a polymer matrix having a melting temperature of 180° C. or more, a glass transition temperature of 180° C. or more, or a cross-linked structure that prevents flow at 180° C.

Any of the above aspects of the teachings herein may be further characterized by one or any combination of the following: the first steel layer has a thickness of about 0.60 mm or more (preferably about 0.65 mm or more, and more preferably about 0.70 mm or more); the second steel layer has a thickness of about 0.50 mm or less (preferably about 0.40 mm or less, more preferably about 0.35 mm or less, and most preferably about 0.30 mm or less); the first steel layer has a thickness of about 3 mm or less, about 2 mm or less, about 1.5 mm or less, about 1.0 mm or less, or about 0.80 mm or less; the second steel layer preferably has a thickness of about 0.10 mm or more, more preferably about 0.15 mm or more, and most preferably about 0.20 mm or more; the first steel layer has a tensile yield strength of about 220 MPa or more (preferably about 240 MPa or more, more preferably about 260 MPa or more, and most preferably about 280 MPa or more); the first steel layer preferably has a tensile yield strength of about 1150 MPa, or less about 1000 MPa or less, about 800 MPa or less, about 600 MPa or less, about 500 MPa or less, about 400 MPa or less, about 360 MPa or less, or about 340 MPa or less; the second steel layer preferably has a tensile yield strength that is less than the tensile yield strength of the first steel layer (e.g., about 300 MPa or less, about 280 MPa or less, about 260 MPa or less, about 240 MPa or less, about 220 MPa or less, or about 200 MPa or less); a ratio of the tensile yield strength of the first steel layer to a tensile yield strength of the second steel layer is about 1.1 or more (preferably about 1.15 or more, even more preferably about 1.20 or more, and most preferably about 1.25 or more); a ratio of the tensile yield strength of the first steel layer to the second steel layer is about 5.0 or less, about 4.0 or less, about 3.0 or less, about 2.5 or less, about 1.80 or less, about 1.6 or less, or about 1.5 or less; the polymeric core layer is characterized by an equilibrium water absorption of about 4.0 weight percent or less (preferably about 3.0 weight percent or less, more preferably about 2.5 weight percent or less, and most preferably about 2.0 weight percent or less) as measured according to ASTM D570-98 (2018) at a temperature of about 25 ° C.; the polymeric core layer includes one or more elongated fillers having a specific gravity of about 3.5 g/cm$^3$ or less and having an aspect ratio of a length (i.e., largest dimension) to a thickness (i.e., smallest dimension) from about 5 to about 1000, or from about 5 to about 100; the concentration of the elongated filler (preferably a fiber) is about 2 volume percent or more (or about 3 volume percent or more, or about 4 volume percent or more, or about 5 volume percent or more, or about 6 volume percent or more), based on the total volume of the polymeric core layer (preferably about 8 volume percent or more, and more preferably about 10 volume percent or more); the elongated filler is an inorganic fiber or a polymeric fiber, wherein the polymeric fiber is formed of a polymer having a peak melting temperature of about 195 ° C. or more, as measured by differential scanning calorimetry at a rate of about 10 ° C./min; the elongated filler includes the polymeric fiber and the peak melting temperature of the polymeric fiber is 205 ° C. or more; the polymeric core layer includes a metallic fiber; the amount of the metallic fiber is about 7 volume percent or less, based on the total volume of the polymeric core layer; the one or more polymers includes a first polymer, a second polymer having a peak melting temperature less than a peak melting temperature of the first polymer, and a third polymer; the third polymer has a higher Hildebrand solubility parameter than a Hildebrand solubility parameter of the first and second polymers (e.g., includes polar components greater than the first and second polymers); the one or more polymers includes a first polyolefin having a peak melting temperature greater than a second polyolefin; the one or more fillers is provided in a sufficient amount so that the melt flow rate of the polymeric core layer is reduced by at least about 40% (preferably at least about 75%) compared with the polymeric core layer having the same polymers and no filler; the one or more polymers includes a polymer having a melting temperature of about 195 ° C. or more (preferably present in an amount of about 25 volume percent or more, 40 volume percent or more, or 55 volume percent or more, based on the total volume of the polymeric core layer and /or based on the total volume of the one or more polymers); the one or more polymers comprises: a first polymer block comprising about 85 weight percent or more (preferably about 95 weight percent or more) of one or more olefin monomers, based on the total weight of the first polymer block, and a second polymer block polymer comprising about 0 weight percent or more olefin monomer to about 20 weight percent olefin monomers, based on the total weight of the second polymer block; the first polymer block is grafted onto the second polymer block, or the second polymer block is grafted onto the first polymer block; the first polymer block is present in an amount from about 20 weight percent to about 80 weight percent and the second polymer block is present in an amount from about 20 weight percent to about 80 weight percent of the block copolymer; the polymeric core layer is attached to the first metal layer by a primer layer; the first steel layer has a different thickness than the second steel layer (preferably the thickness of the first steel layer is greater than the second steel layer by about 5% or more, about 10% or more, about 20% or more, about 30% or more, or about 40% or more); a tensile yield strength of the first steel layer and a tensile yield strength of the second steel layer differ by about 10% or more, as measured according to ASTM standard test method for steel (e.g., E8); the polymeric core layer has a low shear flow value of about 0.04 g or less (as measured at 177° C. for 30 minutes with a mass of 0.91 kg on a 5.1 mm×5.1 mm specimen); or the polymeric core layer is provided as an extruded layer or a calendared layer.

Another aspect according to the teachings herein is directed at an automotive part comprising a composite material according to the teachings herein. The automotive part may be a part requiring durability and/or resistance to denting and/or resistance to impact. The automotive part preferably is a vehicle bumper or a vehicle bumper fascia. The automotive part may be an electric battery cover. The automotive part preferably deforms by less than about 1%, after thermal cycling through a paint bake cycle (e.g., from about 25° C. to about 190° C. and then returning to about 25° C., preferably over a time of about 15 to 60 minutes). Preferably, any change in the spacing between the first steel sheet and the second steel sheet after 30 minutes at 177° C. is about 5% or less (preferably about 3% or less, more preferably about 2% or less, and most preferably about 1% or less). The automotive part may have a surface of the first steel sheet having a chrome plating.

Another aspect according to the teachings herein is directed at a method of manufacturing the composite material. The method preferably includes a step of extruding the polymeric layer and interposing the polymeric layer between the steel sheets. The method may include cross-linking the polymeric layer or reacting the polymeric layer so that flow of the polymeric layer at 177° C. is reduced or eliminated.

Another aspect according to the teachings herein is directed at a method of forming a vehicle part comprising a step of stamping a composite material, as disclosed herein, wherein the first steel sheet is an outer surface of the vehicle part and the second steel sheet is generally hidden from view when installed on an automotive vehicle. Preferably, the vehicle part is a bumper, a bumper fascia, or a cover for an automotive battery (e.g., an automotive battery cover for a plug-in electric vehicle or a hybrid electric vehicle).

BRIEF DESCRIPTION OF THE DRAWINGS

As illustrated in FIG. 3, the composite material may include filler particles, polymer molecules attached to a filler particle, polymer molecules attached to two different surfaces, or both.

As illustrated in FIG. 4, the composite material may include a polymeric core layer having a network structure.

DETAILED DESCRIPTION

Figure 1:
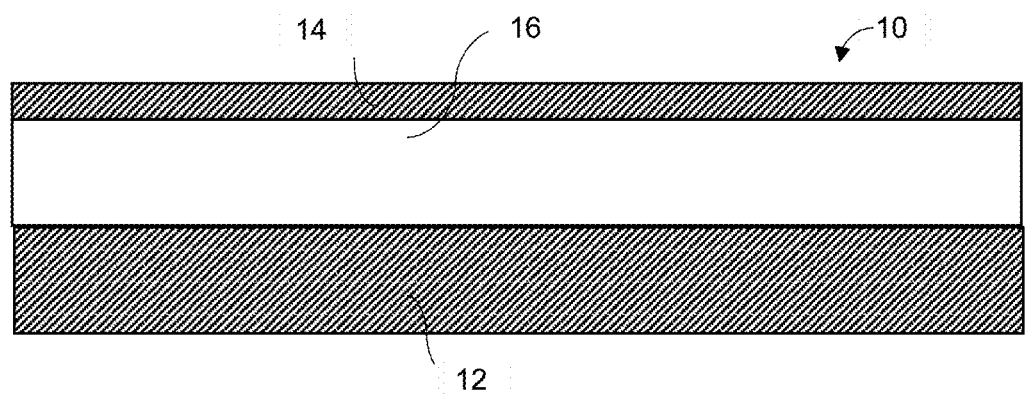
FIG. 1 is a cross-sectional view showing features of a composite material according to the teachings herein.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The composite material according to the teachings herein includes a polymeric core layer interposed between two steel layers. The polymeric core layer and the steel layers are selected for improved performance particularly when exposure to one or more automotive paint bake cycle is expected.

The polymeric layer be formed of a filled polymeric material or an unfilled polymeric material. As used herein, an unfilled polymeric material includes less than 2 volume percent of filler material, preferably 1 volume percent or less filler material. An unfilled polymeric material may include 0 volume percent or more of filler material. A filled polymeric material, as used herein, includes 2 volume percent or more of one or more fillers. The filled polymeric material may include 4 volume percent or more, 10 volume percent or more, 15 volume percent or more, 20 volume percent or more, 30 volume percent or more, or 40 volume percent or more of one or more fillers, based on the total weight of the filled polymeric material. Preferably the amount of the one or more fillers in the filled polymeric material is about 70 volume percent or less, more preferably about 50 volume percent or less, and even more preferably about 45 volume percent or less. Inorganic fillers are most preferably employed in an amount of about 40 volume percent or less, about 30 volume percent or less, or about 20 volume percent or less, based on the total weight of the filled polymeric material.

The polymeric layer preferably is formed of a polymeric material having a high viscosity, so that flow of the polymeric layer between the metal layers is reduced or eliminated when the composite material is exposed to an automotive paint bake oven. Preferably, the polymeric material has a high viscosity at a temperature of about 200° C. or less, about 190° C. or less, or about 180° C. or less. For example, the polymeric material may have a generally low melt flow rate of about 2.0 g/10 min or less, about 1.5 g/10 min or less, about 1.0 g/10 min or less, about 0.70 g/10 min or less, about 0.50 g/10 min or less, about 0.30 g/10 min or less, or about 0.10 g/10 min or less, as measured according to ASTM D 1238-13 at 190° C./2.16 kg. The polymeric material may have a melt flow rate of about 0 or more, about 0.001 g/10 min or more, about 0.01 g/10 min or more, or about 0.02 g/10 min or more.

The high viscosity of the polymeric material may be achieved by selecting one or more polymers having a transition temperature (i.e., melting temperature or glass transition temperature) of 190° C. or more, as measured by differential scanning calorimetry. Preferably, the polymeric material has a polymer matrix that consists primarily of or consists entirely of polymers having a transition temperature of 190° C. or more. For example, the amount of the polymer having a transition temperature of 190° C. or more may be about 50 weight percent or more, about 60 weight percent or more, about 70 weight percent or more, or about 80 weight percent or more based on the total weight of the polymers in the polymeric material. The amount of polymer having a transition temperature of about 190° C. or more may be about 100 weight percent or less, based on the total weight of the polymers in the polymeric material.

The high viscosity of the polymeric material may be achieved by including a polymer that is cross-linked, has long chain branches, or is capable of cross-linking or grafting (e.g., prior to or during an automotive bake) to form a network or branched structure. Examples of polymers that are cross-linked include thermoset polymers and cross-linked elastomers. Thermoset polymers typically include one or more multi-functional monomers or multi-functional prepolymers. Preferred thermoset polymers have a glass transition temperature of about 190° C. or more, or about 200° C. or more. Cross-linked elastomers are generally formed by polymers having a glass transition temperature of less than about 25° C. After cross-linking, the glass transition temperature remains below 25° C., but the network structure formed by the cross-links connecting the polymer molecules prevents flow of the polymer.

The high viscosity of the polymeric material may be achieved by including one or more fillers that does not flow at 190° C., including polymers having low melt flow rate at 190° C., or both. The amount of the filler and the melt flow rate of the polymers may be selected so that the polymeric material has a generally low melt flow rate at 190° C./2.16 kg, such as a melt flow rate as discussed above. For example, the polymeric material may include one or more high viscosity polymers having a melt flow rate of about 5 g/10 min or less, about 2.0 g/10 min or less, about 1.0 g/10 min or less, about 0.5 g/10 min or less, or about 0.10 g/10 min or less. The amount of the high viscosity polymers may be about 40 weight percent or more, about 50 weight percent or more, about 60 weight percent or more, about 75 weight percent or more, or about 85 weight percent or more, based on the total weight of the polymers of the polymeric material. The amount of the high viscosity polymers may be about 100 weight percent or less, or about 90 weight percent or less, based on the total weight of the polymers of the polymeric material.

As discussed herein, the polymeric layer may be formed from a filled polymeric material including one or more fillers. The filler may reduce the melt flow rate of the filled polymeric material. The filler is preferably present as discrete particles in a matrix including one or more polymers. The filled polymeric material preferably is capable of being processed by a polymer polymer processing technique such as extrusion, calendaring, thermoforming, or any combination thereof. The one or more fillers may include an organic filler, an inorganic filler, or both. Examples of organic fillers include fillers formed of a polymer having a melting temperature of about 190° C. or more, about 200° C. or more, about 210° C. or more, or about 220° C. or more. The organic filler may be in the form of fibers or other particles. The filled polymeric material preferably is processed (e.g., including extrusion, calendaring, thermoforming, or any combination thereof) in a polymeric layer at a temperature sufficiently high to flow the polymer of the matrix and sufficiently low so that particles of the organic filler generally do not melt or soften. The organic fillers preferably maintain their general shape during the forming of the polymeric layers. The inorganic filler may be any inorganic filler that is capable of being dispersed in the one or more polymers of the filled polymeric material. Preferably the entirety of the core layer is capable of being prepared in one or more polymer processing steps (e.g., extrusion, calendaring, or thermoforming), and more preferably, the entirety of the core layer is capable of being prepared in a single polymer processing step.

The one or more fillers may have any shape. For example, the filler may have a generally spherical shape or an elongated shape. Fillers having an elongated shape are generally more effective at reducing or preventing flow of the polymeric material. Preferred fillers having an elongated shape include fibers and plate-like filler particles. The elongated filler preferably has a longest dimension (e.g., a length) and a shortest dimension (e.g., a thickness) wherein the aspect ratio of the longest dimension to the shortest dimension is about 2:1 or more, about 4:1 or more, about 6:1 or more or about 10:1 or more. The fibers may have any shape. For example, a cross-section of the fiber perpendicular to the length direction may have a circular shape, a polygonal shape, a shape including one or more straight sides, a shape including one or more curved sides, or any combination thereof. The fibers may have an acicular structure. Organic fibers may be formed by extruding a polymer. An example of an inorganic fibers is wollastonite. Wollastonite typically has an acicular structure.

The filler may be characterized by any specific gravity and typically has a specific gravity from about 0.8 to about 7.9. Preferably the specific gravity of the filler is about 4 or less, more preferably about 3.3 or less, and most preferably about 2.9 or less. Inorganic fillers may have a specific gravity of about 1.5 or more, about 1.9 or more, or about 2.2 or more. Inorganic fillers may have hollow portions, such that the specific gravity is less than 1.5. For example, inorganic fillers having hollow portions such as closed pores typically have a specific gravity of 0.1 or more, or 0.3 or more, or 0.6 or more. Organic fillers typically have a specific gravity of about 2.0 or less, about 1.5 or less, about 1.3 or less, or about 1.15 or less. Organic fillers typically have a specific gravity of about 0.8 or more, about 0.85 or more, or about 0.9 or more.

The polymeric core layer may include a polymers additive that forms an elongated phase dispersed in a polymer matrix phase. For example, the polymeric core layer may include a modified PTFE, such as an acrylic modified PTFE commercially available as METABLEN™ from Mitsubishi Chemical.

Combination of metal fibers and one or more additional fillers may be employed so that the total amount of filler (as measured by volume percent) can be increased while maintaining a generally low density of the polymeric core layer. Preferably the ratio of the density of the additional filler to the density of the metal fibers is about 0.8 or less, about 0.7 or less, about 0.6 or less, or about 0.5 or less. The metal fiber preferably is a steel fiber. The filler may be any filler as discussed herein. For example, the core polymeric layer may include a combination of a metal fiber (e.g. a steel fiber) and a non-metallic fiber (e.g., an organic fiber, a glass fiber, or a mineral filler having an elongated shape).

Adhesion

The composite material preferably includes an adhesive component for adhering to the metal layers. Adhesion of the polymer to the steel layers has surprisingly been found to reduce the flow of the polymeric material. Without being bound by theory, it is believed that the polymer adhered to the results in a drag which reduces or eliminates flow of the polymer. Adhesion to the steel layers may also result in a material having improved durability and/or may prevent delamination. The adhesive component may be provided as a separate layer (polymeric or otherwise) or may be provided in a polymeric layer. For example, the adhesive component may be provided as an adhesive layer between a polymeric layer and a metallic layer. It will be appreciated that the composite material may have two adhesive layers, each arranged on a surface of one of the metallic layers, so that both metallic layers adhere to the core (e.g., a polymeric layer). The adhesive layer may be a polymeric layer, so that the composite material includes multiple polymeric layers. Alternatively, the adhesive layer may be a non-polymeric layer.

The composite material preferably includes a separate adhesive component, provided as a polymeric layer or otherwise, for adhering to each metallic layer. The composite material preferably includes at least 5 layers: two metallic layers, a polymeric layer, and two adhesive layers. It will be appreciated that the one or more features discussed herein with respect to the adhesive component may be provided in a polymeric layer that spans the thickness between the metallic layers, so that the polymeric layer adheres to both metallic layers. However, in a preferred approach, the polymeric layer in the core does not include the adhesive component.

The adhesive component may be any compound that adheres to metal. The adhesive component may be a primer material that adheres to metal. The adhesive component may include a silane-containing compound. The adhesive component may include a reactive monomer or reactive prepolymer compound. The adhesive component may be a single layer or may include multiple layers. For example, the adhesive component may include a primer layer and/or an adhesive layer. The adhesive component may include a polymeric material that adheres to the metallic layer or to a primer layer. Preferred polymer materials include functional groups that adhere to the metallic layer or to the primer layer. The functional group may adhere by reacting with the underlying surface. The polymer may be formed from a monomer including the functional group, such as by a homopolymer or a copolymer including the monomer having the functional group. The copolymer may be any type of copolymer. Preferably the copolymer is a random copolymer, a graft copolymer, or a block copolymer including two or more polymer blocks. The copolymer may include a portion that does not include the functional group. Preferably, this portion reacts with and/or adheres to and/or is compatible with a polymer of the polymeric layer. The polymer may be provided as monomer and/or prepolymer that reacts after contact with the surface to form the polymer. The copolymer preferably includes a functional monomer The polymer may contain one or more functional groups which may promote adhesion to the surface of the steel layer or to the filler particles. The polymer may include (for example, as a monomer of the polymer, as a grafted functional group, or as a polymer block) one or more polar group or functional group selected from the group consisting of a carboxyl, a carbonyl, a hydroxyl, an amino, a nitrogen containing heterocyclic compound (such as a pyridyl), a sulfonyl, a sulfide, a sulfonate, a phosphate, and a phosphine, or any combination thereof. As another example, the polymer block may contain one or more anion which reacts with the surface of core particles.

The polymer may include a first polymer block that is a polar polymer block and a second polymer block (e.g., a generally non-polar block). The polar polymer block, may be characterized by a relatively high cohesive energy density. For example, the first polymer block may have a Hildebrand solubility parameter, δ, of greater than about 17.3 MPa$^{1/2}$, more preferably greater than about 18.2 MPa$^{1/2}$, and most preferably greater than about 18.9 MPa$^{1/2}$. The measurement of Hildebrand solubility parameters is well known in the art and values for many polymers are listed in Barton, AFM, Handbook of Polymer Liquid Interaction Parameters and Other Solubility Parameters. CRC Press, 1990.

Polymer molecules for adhesion to a steel sheet or to a filler particle may include a polar monomer. The term "polar comonomer" refers to organic molecules (e.g. monomers) haying a carboxyl, hydroxyl, anhydride or other oxygen functionality. When grafted onto polyolefins and/or thermoplastic elastomers, these monomers exhibit polar attraction to, and under certain conditions may chemically react with, polar surfaces of polymers, polyamides, polyvinyl alcohol, ethylene vinyl alcohol copolymer, metals, glass, inorganic fillers, wood and/or paper and other substrates. Suitable polar monomers include without limitation carboxylic and dicarboxylic acids and their anhydrides, for instance maleic acid, fumaric acid, maleic anhydride; 4-methylcyclohex-4-ene-1,2 dicarboxylic acid and its anydride; tetrahydrophthalic acid and its anhydride; methylnorborn-5-ene-2,3 dicarboxylic acid and its anhydride; norborn-5-ene-2,3 dicarboxylic acid and its anhydride; maleo-pimaric acid and its anhydride; bicyclo(2.2.2)oct-5-ene-2,3-dicarboxylic acid and its anhydride; 1,2,3,4,5,8,9,10-octahydronaphthalene-2,3-dicarboxylic acid and its anhydride; 2-oxa-1,3,-diketospiro (4.4)non-7-ene, bicyclo(2.2.1)hept-5-ene-2,3-dicarboxylic acid and its anhydride: nadic anhydride, methyl nadic anhydride, himic anhydride, and methyl himic anhydride. Other suitable polar monomers are described in U.S. Pat. Nos. 3,873,643 and 3,882,914, the disclosures of which are incorporated by reference. The polymer may include one or more functional groups selected from maleic anhydride, a carboxylic acid, an amine, an alcohol, or an epoxide.

The polymer may include a polymer backbone (polar or nonpolar) and a functional group grafted or reacted onto the backbone. Typical functional moieties which can be reacted with the polymer backbone to impart polarity include (without limitation) unsaturated carboxylic acids; functional derivatives of the carboxylic acids including anhydrides, esters, and amides; metal salts of unsaturated carboxylic acids; imides; and mixtures of the foregoing. Of these, maleic anhydride is especially preferred. The maleic anhydride or other functional moiety can be thermally grafted, copolymerized or otherwise reacted onto the polymer backbone at a concentration of about 0.01-15% by weight of the polymer backbone, preferably about 0.1-8% by weight of the polymer backbone, most preferably about 0.2-4% by weight of the polymer backbone. Overall, the active ingredient (defined as polyolefin reacted with functional moiety) constitutes at least about 0.5 percent by weight, preferably about 1.0 percent by weight or more, based on the total weight of the polymer of the core polymeric layer. It will be appreciated that preferred amounts may vary depending on the amount and type of the functional moiety reacted with the polymer backbone.

An example of a functionalized polymer that may be employed for improving the adhesion is a maleic anhydride grafted polyolefin, such as AMPLIFY™ GR Functional. A particularly preferred resin is AMPLIFY™ GR 216, having a melt index of about 1.25, a hardness of about 77Shore A (durometer@1 sec) and based on a plastomer having a density of about 0.870 g/cm$^3$. Typically this grade is not used for extrusion processes.

As discussed herein, the polymeric core layer may include filler. It has surprisingly observed that by adding polymer molecules that adhere to the filler surface, the flow of the polymer core layer may be reduced or eliminated. Without being bound by theory, it is believed that the polymer molecules that are adhered to the filler provides a drag/resistance to the flow of the polymer in the core. The polymeric core layer preferably includes polymer molecules that span between two filler particles and/or that span between a metal surface and a filler particle. The selection of polymer and or functional group for adhering to a filler particle may be any of the compounds discussed herein for adhering to the steel sheet. However, it will be appreciated that the selection of polymer or functional group will depend on the characteristics of the filler. For example, when an organic filler is employed, the adhesive may be selected to react with the organic filler and/or to have similar polarity as the organic filler.

In order to reduce the flow of the polymeric core layer, the polymeric core layer may include components that are not typically employed in extrusion processes. For example, the polymeric core layer may include polymers having high molecular weight, long chain branching, a low melt flow rate, or any combination thereof. As used herein, a long chain branch typically includes about 10 or more atoms along the backbone of the branch, preferably about 15 or more atoms, and most preferably about 20 or more atoms. Polymers having low melt flow rate preferably have a melt flow rate of about 2.0 or less, about 1.5 or less, about 1.2 or less, about 1 or less, or about 0.7 or less (in units of g/10 min, as measured according to ASTM D1238).

One approach for reducing the flow of the polymeric layer in the composite material is to replace some or all of the polyethylene in the composition with a polymer having a higher peak melting temperature. The high melt temperature polymer may be a polyolefin such as polypropylene. The high melt temperature polymer may have a peak melt temperature of about 150° C. or more, about 170° C. or more, about 190° C. or more, or about 210° C. or more.

Preferably, the amount of polymer having a peak melting temperature of less than 150° C. is about 45 weight percent or less, more preferably about 40 weight percent or less, even more preferably about 35 weight percent or less, and most preferably about 30 weight percent or less, based on the total weight of the polymers of the polymeric core layer.

An example of a high melting temperature polymer is a polyamide. The polyamide may be a homopolymer or may be a block copolymer with a polyolefin. Any polyamide may be employed. The polyamide may be a polyamide 6,6 or 6, 12.

Water Absorption

One or more of the polymeric layer(s) preferably is formed of a material having a low water absorption, so that the polymeric core reduces or prevents diffusion of moisture through the core and to an interface between the core and a metal layer. Preferably, the entirety of the core layer has a low water absorption. The water absorption of a polymeric layer or the entire polymeric core may be about 3 weight percent or less, about 2 weight percent or less, about 1 weight percent or less, about 0.5 weight percent or less, or about 0.2 weight percent or less, as measured according to ASTM D570-98(2018). The water absorption of the polymeric layer(s) or the entire polymeric core may be about 0.0 weight percent or more, or about 0.1 weight percent or more. In addition to having a low water absorption, a polymeric layer may have one or more fillers that forms a discrete filler phase in a continuous polymer matrix and present a tortuous path for the diffusion of water molecules in the polymer matrix. The filler may absorb less water or more water than the polymer matrix. Preferably, the filler absorbs less water than the polymeric matrix. Fillers that present a tortuous path typically have an elongated shape. Fillers having an elongated shape preferably have a generally plate-like shape or a generally fiber shape; and more preferably a plate-like shape.

Polar polymers typically absorb large amounts of water which may deleteriously affect the long-term aging durability of the composite material. In order to reduce the water absorption, the polar polymer may be provided as a blend or copolymer with one or more generally non-polymers.

The first steel sheet and the second steel sheet may be formed of any steel. The first steel sheet preferably has a sufficient thickness and/or is formed of a steel having a sufficient tensile yield strength so that the composite material has good dent resistance. The first steel sheet and the second steel sheet may be formed from the same grade of steel or from different grades of steel. The first steel sheet and the second steel sheet may have the same thickness or may have different thicknesses. The first steel sheet may be a single-phase steel or a dual phase steel. Preferably, the first steel sheet and the second steel sheet are formed of different grades of steel and/or the first steel sheet and the second steel sheet have different thicknesses. More preferably, the first steel sheet and the second steel sheet are formed of different grades of steel and the first steel sheet and the second steel sheet have different thicknesses. Different grades of steel preferably have different tensile yield strength, preferably differing by about 8% or more. The first steel layer should be sufficiently thick so that the composite material rigid. The first steel layer may have a thickness of about 0.020 mm or more, about 0.030 mm or more, about 0.040 mm or more, about 0.050 mm or more, about 0.60 mm or more, about 0.65 mm or more, or about 0.70 mm or more. If the second steel layer has too high of a thickness, it will not be possible to achieve sufficient weight reduction. The second steel layer preferably has a thickness of about 0.50 mm or less, more preferably about 0.40 mm or less, even more preferably about 0.35 mm or less, and most preferably about 0.30 mm or less. If the first steel layer is too thick, it will add unnecessary weight (e.g., to the automotive component). The first steel layer preferably has a thickness of about 2 mm or less, more preferably about 1.5 mm or less, even more preferably about 1.0 mm or less, and most preferably about 0.80 mm or less. If the second steel layer is not sufficiently thick, there may be difficulties in manufacturing the composite material and/or the second steel layer may crack during stamping or drawing. The second steel layer preferably has a thickness of about 0.10 mm or more, more preferably about 0.15 mm or more, and most preferably about 0.20 mm or more. If the tensile yield strength of the first steel layer is too low, the composite material may not be sufficiently stiff or rigid, such as for an automotive bumper/fascia or a battery cover. The first steel layer preferably has a tensile yield strength of about 220 MPa or more, more preferably about 240 MPa or more, even more preferably about 260 MPa or more, and most preferably about 280 MPa or more. If the tensile yield strength of the first metal layer is too high, it may be difficult to form the composite material, such as by stamping or other drawing operation, and the resulting component may show surface defects or irregularities after a painting step or plating step (e.g., a chrome plating step). The first steel layer preferably has a tensile yield strength of about 600 MPa or less, more preferably about 500 MPa or less, even more preferably about 400 MPa or less, even more preferably about 360 MPa or less, and most preferably about 340 MPa or less. The second steel layer preferably has a tensile yield strength that is less than the tensile yield strength of the first steel layer (e.g., about 300 MPa or less, about 280 MPa or less, about 260 MPa or less, about 240 MPa or less, about 220 MPa or less, or about 200 MPa or less). The ratio of the tensile yield strength of the first steel layer to the tensile yield strength of the second steel layer is preferably about 1.08 or more, more preferably about 1.10 or more, even more preferably about 1.15 or more, even more preferably about 1.20 or more, and most preferably about 1.25 or more. The ratio of the tensile yield strength of the first steel layer to the tensile yield strength of the second steel layer may be about 5.0 or less, about 4.0 or less, about 3.0 or less, about 2.5 or less, about 1.8 or less, about 1.6 or less, or about 1.4 or less.

The steel layers preferably have a density of about 7.2 $g/cm^3$ or more, about 7.6 $g/cm^3$ or more, or about 7.7 $g/cm^3$ or more. The steel layers preferably have a density of about 8.2 $g/cm^3$ or less, about 8.0 $g/cm^3$ or less, or about 7.8 $g/cm^3$ or less.

Density of the Composite Material

The materials of the polymeric core layer and the thickness of the polymeric core layer are selected so that the composite material offers generally large weight reduction compared with monolithic steel. Preferably, the composite material has a density reduction of about 15% or more, about 20% or more, about 22% or more, about 25% or more, or about 27% or more, compared with the density of monolithic steel (e.g., the steel of the first steel sheet). The density of the composite material preferably is about 6.6 $g/cm^3$ or less, more preferably about 6.3 $g/cm^3$ or less, even more preferably about 6.0 $g/cm^3$ or less, even more preferably about 5.8 $g/cm^3$ or less, and most preferably about 5.6 $g/cm^3$ or less. The density of the composite material may be about 2.2 g/cm³ or more, about 3 g/cm³ or more, about 4 g/cm³ or more, or about 5 g/cm³ or more.

The composite material may have a thickness of about 0.6 or more, about 0.7 or more, about 0.8 or more, about 0.9 or more, about 1.0 or more, about 1.1 mm or more, or about 1.2 mm or more. The composite material may have a thickness of about 10 mm or less, about 6 mm or less, about 5 mm or less, about 4 mm or less, about 3 mm or less, about 2.5 mm or less, about 2.0 mm or less, or about 1.5 mm or less. The thickness of the polymeric core layer preferably is about 0.2 mm or more, more preferably about 0.3 mm or more, and most preferably about 0.5 mm or more.

Test Methods

Melting Temperature/Glass Transition Temperature

Melting temperature and glass transition temperature are measured according to ASTM D3418-15 using differential scanning calorimetry. Unless otherwise specified, the specimen is heated at a rate of about 10° C./min.

Water Absorption

Melt Flow Rate

Melt flow rate of a polymer, polymer blend or polymeric layer may be measured according to ASTM D 1238-13. Unless otherwise stated, the melt flow rate is measured at 190° C./2.16 kg. For polymers including at least 60 weight percent propylene, the melt flow rate is measured at 230° C./2.16 kg for polymers Adhesion Adhesion may be evaluated using a T-peel test. Unless otherwise stated, T-peel is tested according to according to ASTM D1876. The adhesion may be characterized by the peel strength which is the peel force per unit width (in units of N/mm) and/or by the failure mode (e.g., percent cohesive failure, percent adhesive failure). For example, the failure mode may be a percent of the area of the surface at which failure has occurred that is a cohesive failure. Preferably the adhesion between the core layer and the metal layer is characterized by a peel strength (T-peel test) of about 7 N/mm or more, more preferably about 10 N/mm or more, even more preferably about 12.5 N/mm or more, even more preferably about 15.0 N/mm or more, even more preferably about 17.5 N/mm or more, and most preferably about 20.0 N/mm or more. The peel strength may be about 200 N/mm or less, about 100 N/mm or less, about 50 N/mm or less or about 30 N/mm or less. The failure mode of the T-peel test preferably includes cohesive failure of 20% or more, more preferably about 40% or more, even more preferably about 60% or more, even more preferably about 80% or more, and most preferably about 95% or more. The amount of cohesive failure may be about 100% or less.

Adhesion Durability

Adhesion durability may be characterized by a ratio of an adhesion performance after an accelerated aging test to the adhesion performance before the accelerated aging test. For example, the adhesion durability may be characterized by the retention of peel strength (measured according to ASTM D1876). Preferably the retention of peel strength after accelerated aging is about 30% or more, more preferably about 50% or more, even more preferably about 60% or more, even more preferably about 70% or more, even more preferably about 80% or more, and most preferably about 90% or more. It will be appreciated that other adhesion tests may be employed (such as a lap shear test) may be used for measuring adhesion and or adhesion durability). The accelerated aging may be a thermal exposure test of 30 minutes at 200° C., or other conditions to simulate exposure to an E-coat and paint bake process. The accelerated aging may include an automotive OEM cyclic exposure test. Examples of OEM cyclic exposure test include SAE J2334 for 12 weeks and/or for 24 weeks; ASTM B-117 salt spray exposure for 200 hours; and CASS Copper Accelerated Acetic Acid ASTM B368 exposure for 72 hours, and long term thermal aging of 1000 hours at 100 C. The adhesion durability may be tested at one or more of the above mentioned conditions. Preferably the retention of adhesion (e.g. T-peel strength, cohesive failure, or other peel test) after accelerated aging is about 30% or more, more preferably about 50% or more, even more preferably about 60% or more, even more preferably about 70% or more, even more preferably about 80% or more, and most preferably about 90% or more.

Equilibrium Water Absorption

Equilibrium water absorption of a polymer or polymeric layer may be measured according to ASTM D570-98 (2018). Unless otherwise specified, the equilibrium water absorption is measured at a temperature of about 25° C.

Density/Specific Gravity

The density and specific gravity of a polymeric material, a metallic layer, or a composite material may be measured according to ASTM D 792-13.

Tensile Testing

Unless otherwise specified, tensile properties of the metal layers and composite material may be measured according to ASTM E8 /E8M-16a. Tensile properties include tensile strength, tensile yield strength , elongation at failure, and yield point elongation.

Low Shear Flow Test

The low shear flow test is a measure of the amount of material that flows out a specimen of a composite material. The specimen is prepared by cutting the composite material into 5.1 mm×5.1 mm coupons. Unless otherwise specified, the composite material has a polymeric core layer having a thickness of about 0.6 mm. The coupons are placed on a 250 mm×250 mm steel base plate having a thickness of about 1.5 mm. A metal block having a mass of about 0.91 kg with a base area of about 5.1 mm×5.1 mm is placed on each coupon, so that the mass is evenly distributed over the surface of the specimen. The test is conducted by preheating the metal block and the base plate to the test temperature. The specimen is then placed between the base plate and the metal block, and heated in the oven at the test temperature. Unless otherwise specified, the test temperature is about 350° F. (i.e., about 177° C.) and the force of the metal block is maintained for about 30 minutes. The specimen is then removed from the oven and the block removed. After cooling, the composite material is trimmed to remove the material of the polymeric core that has flowed out of the gap defined by two metal sheets of the specimen. The low shear flow value is the mass of the trimmed material in units of grams.

FIG. 1 is an illustrative cross-section of a composite material 10 including a first steel sheet 12, a second steel sheet 14, and a polymeric core layer 16.

Figure 2:
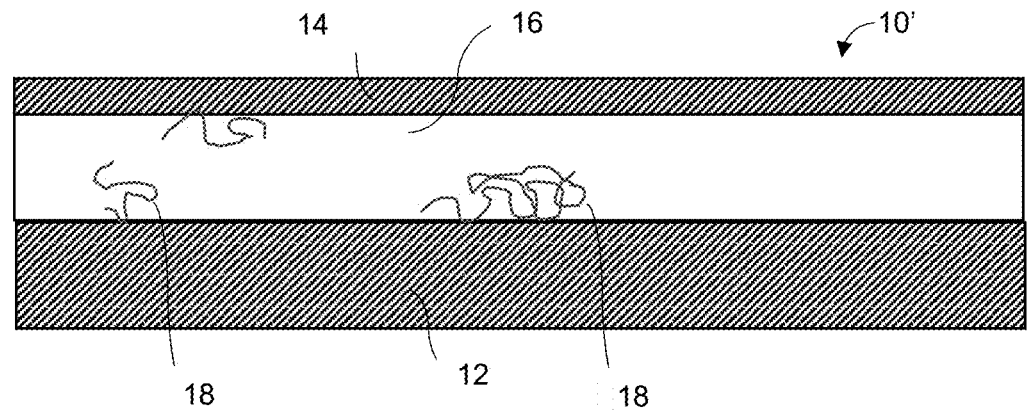
FIG. 2 is a cross-sectional view showing features of a composite material according to the teachings herein, and shows polymer molecules attached to a steel sheet.

FIG. 2 shows polymer molecules 18 attached to a steel surface. The attached molecules provide drag to the flow of the polymeric core layer and may reduce or eliminate flow of the polymeric core layer (e.g., when a compressive force is applied to the metal layers).

Figure 3:
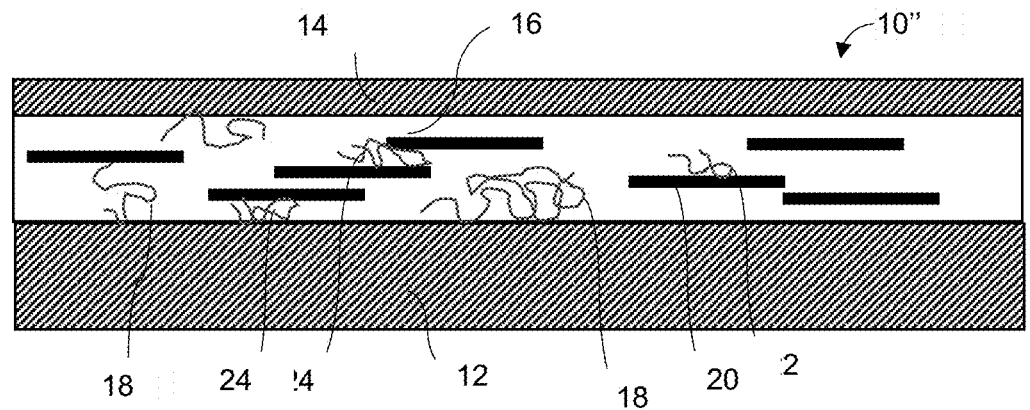
FIG. 3 is a cross-sectional view showing features of a composite material according to the teachings herein.

FIG. 3 shows a polymeric core layer including filler particles 20. Polymer molecules may be attached to the filler 22 and polymer molecules may be attached to surfaces of two different components of the composite material. For example, a polymer molecule may be attached to a surface of a filler and a surface of a steel sheet 24 and/or attached to a surface of two different filler particles 24'. The filler particles and the molecules attached to the filler particles may prevent flow of the polymeric core layer. The linking of a filler particle with a metal surface or with another filler particle is particularly efficient at reducing flow of the polymeric core layer.

Figure 4:
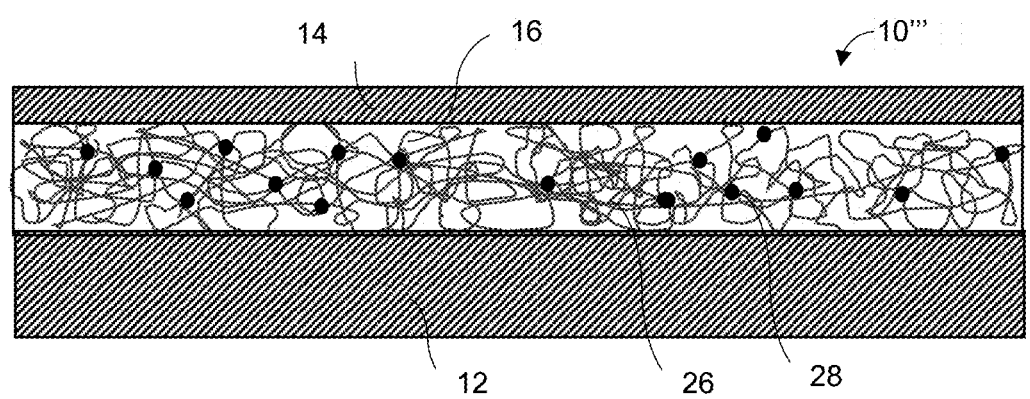
FIG. 4 is a cross-sectional view showing features of a composite material according to the teachings herein.

With reference to FIG. 4, the polymeric core layer may include a network structure 26 formed from cross-linking 28 or otherwise linking polymer molecules. The network structure may eliminate or reduce flow of the polymeric core layer. When attached to the metal sheets, the network structure may reduce or prevent separation of the metal layers.

Polyethylene 1 is a linear low density polyethylene having a density of 0.922 g/cm$^3$ (as measured according to ASTM D792), a melt index of about 1.0 g/10 min (as measured according to ASTM D1238 at 190° C./2.16 kg), a melting temperature of about 122° C. as measured by differential scanning calorimetry, and a tensile strength of about 194 MPa (MD) and 233 MPa (TD), as measured according to ASTM D882 (on a film having a thickness of about 51 µm).

Polyethylene 2 is a linear low density polyethylene having a density of 0.920 g/cm$^3$, a melt index of about 1.0 g/10 min (as measured according to ASTM D1238 at 190° C./2.16 kg), and a tensile strength of about 50 MPa (MD) and 39 MPa (TD), as measured according to ASTM D882 on 1.0 mil film.

POE-1 is a polyolefin elastomer. POE-1 is a copolymer of ethylene and octene and has a density of about 0.868 g/cm$^3$, a melt flow rate of about 0.5 (ASTM D1238 at 190° C./2.16 kg), a crystallinity of about 16 percent; a melting temperature of about 55° C. as measured by differential scanning calorimetry, and a tensile strength of about 9.5 MPa, as measured according to ASTM D638 at 508 mm/min.

POE-2 is a polyolefin elastomer. POE-2 is VISTAMAXX® 6102, commercially available from EXXONMOBIL CHEMICAL. POE-2 is a copolymer of propylene with about 16 weight percent ethylene and contains isotactic polypropylene, has a density of about 0.862 g/cm3, and a melt flow rate of about 3 g/10 min (at 230° C./2.16 kg).

Filler 1 is VANSIL® HR325 wollastonite, commercially available from VANDERBILT MINERALS, LLC.

Filler 2 is talc.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the Invention of a range in terms of at "'x' parts by weight of the resulting polymeric blend composition" also contemplates a teaching of ranges of same recited amount of "x" in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

EXAMPLES

Example 1

Example 1 is a polymeric composition prepared by mixing polyethylene 1 (26.5 weight percent), POE-1 (3.5 weight percent), and stainless steel fibers (70 weight percent). The polymeric composition has a melt flow rate (at 190° C./2.16 kg) of 1.2 g/10 min; and a specific gravity of 2.27.

Example 2

Example 2 is a polymeric composition prepared by mixing polyethylene 2 (20.0 weight percent), POE-1 (10 weight percent), and stainless steel fibers (70 weight percent). The polymeric composition has a melt flow rate (at 190° C./2.16 kg) of 2.7 g/10 min; and a specific gravity of 2.2.

Example 3

Example 3 is a polymeric composition prepared by mixing polyethylene 2 (24.0 weight percent), POE-1 (6 weight percent), Filler 1 (5 weight percent) and stainless steel fibers (65 weight percent). The polymeric composition has a melt flow rate (at 190° C./2.16 kg) of 0.9 g/10 min; and a specific gravity of 2.15.

Example 4

Example 4 is a polymeric composition prepared by mixing polyethylene 2 (25.0 weight percent), POE-1 (5 weight percent), Filler 2 (5 weight percent) and stainless steel fibers (65 weight percent). The polymeric composition has a melt flow rate (at 190° C./2.16 kg) of 1.2 g/10 min; and a specific gravity of 2.12.

Example 5

Example 5 is a polymeric composition prepared by mixing polyethylene 1 (25.0 weight percent), POE-2 (5 weight percent), Filler 1 (5 weight percent) and stainless steel fibers (65 weight percent). The polymeric composition has a melt flow rate (at 190° C./2.16 kg) of 0.96 g/10 min; and a specific gravity of 2.16.

Example 6

Example 6 is a polymeric composition prepared by mixing polyethylene 1 (25.0 weight percent), POE-2 (5 weight percent), and stainless steel fibers (70 weight percent). The polymeric composition has a melt flow rate (at 190° C./2.16 kg) of 1.1 g/10 min; and a specific gravity of 2.23.

Example 7

Example 7 is a polymeric composition prepared by mixing polyethylene 2 (20.0 weight percent), POE-1 (5 weight percent), filler-2 (20 weight percent) and stainless steel fibers (65 weight percent). The polymeric composition has a melt flow rate (at 190° C./2.16 kg) of 0.8 g/10 min; and a specific gravity of 2.16.

Composite materials are prepared by placing the polymeric composition (of Example 1, 2, 3, 4, 5, 6, or 7) between two steel sheets and heating above the melting temperature of the polymer. The polymeric compositions are evaluated for equilibrium water absorption. The polymeric compositions are evaluated for tensile properties. The polymeric compositions are evaluated for melt flow rate. The composite materials are evaluated for adhesion and adhesion durability. The composite materials are evaluated for flow according to the low shear flow test. The composite materials are evaluated for tensile properties.

REFERENCE NUMBERS

10 Composite Material
12 First steel sheet
14 Second steel sheet
16 Polymeric core layer
18 Polymer molecule attached to surface of steel sheet
20 Filler
22 Polymer molecule attached to surface of filler
24 Polymer molecule attached to two surfaces
26 Network structure extending from the first steel sheet to the second steel sheet
28 Cross-link

What is claimed is:

1. A composite material comprising:
   i) a first steel layer;
   ii) a second steel layer;
   iii) a polymeric core layer interposed between and attached to the first and second steel layers;
   wherein a thickness of the polymeric core layer is about 0.1 mm or more, and a ratio of the thickness of the polymeric core layer to a thickness of the composite material is about 0.25 or more and about 0.90 or less;
   wherein the polymeric core layer includes one or more polymers and 8 volume percent to 16 volume percent of one or more fillers, based on a total volume of the polymeric core layer, selected and arranged so that the polymeric core layer has a low shear flow value of about 0.04 g or less, as measured at 177° C. for 30 minutes with a mass of 0.91 kg on a 5.1 mm×5.1 mm specimen;
   wherein the polymeric core layer is characterized by a melt flow rate, measured at 190° C./2.16 kg, of about 1.0 g/10 min or less;
   wherein the one or more fillers includes less than 7 volume percent of metallic fiber, based on the total volume of the polymeric core layer, and an organic filler wherein a ratio of a density of the organic filler to a density of the metallic fiber is 0.50 or less.

2. The composite material of claim 1, wherein
   the first steel layer has a thickness of about 0.60 mm to about 3.00 mm; and
   the second steel layer has a thickness of about 0.10 to about 0.50 mm.

3. The composite material of claim 1, wherein
   the first steel layer has a tensile yield strength of about 240 MPa to about 1150 MPa;
   and optionally the second steel layer has a tensile yield strength that is less than the tensile yield strength of the first steel layer.

4. The composite material of any of claims 1 through 3, wherein a ratio of the tensile yield strength of the first steel layer to a tensile yield strength of the second steel layer is about 1.1 or more; and the polymeric core layer is characterized by a melt flow rate, measured at 190° C/2.16 kg, of about 0.01 g/10 min or more and about 0.8 g/ 10 min or less.

5. The composite material of claim 1, wherein the one or more polymers includes a first polymer, a second polymer having a peak melting temperature less than a peak melting temperature of the first polymer, and a third polymer, wherein the third polymer has a higher Hildebrand solubility parameter than a Hildebrand solubility parameter of the first and second polymers;
   optionally wherein the first polymer is a polyolefin and the second polymer is a different polyolefin.

6. The composite material of claim 1, wherein the melt flow rate of the polymeric core layer, as measured according to ASTM D 1238-13, is reduced by at least about 40% compared with the polymeric core layer having the same polymers and no filler.

7. The composite material of claim 1, wherein
the first steel layer has a different thickness than the second steel layer; and
a tensile yield strength of the first steel layer and a tensile yield strength of the second steel layer differ by about 10% or more, as measured according to ASTM E8 standard test method for steel.

8. The composite material of claim 1, wherein the first steel layer has a tensile yield strength of 240 MPa or more and a thickness of about 0.55 mm or more; and the second steel layer has a tensile yield strength of less than 220 MPa and a thickness of about 0.40 mm or less.

9. The composite material of claim 8, wherein
the first steel layer has a tensile yield strength of about 260 MPa or more; and
the first steel layer has a tensile yield strength of about 1150 MPa or less; and
a ratio of the tensile yield strength of the first steel layer to the tensile yield strength of the second steel layer is from about 1.15 to about 5.0; and
the polymeric core layer is characterized by an equilibrium water absorption of about 4.0 weight percent or less, as measured according to ASTM D570-98 (2018) at a temperature of about 25° C.

10. The composite material of claim 9, wherein the one or more polymers includes one or more high viscosity polymers having a melt flow rate of about 1.0 g/10 min or less, wherien the amount of the one or more high viscosity polymers is 75 weight percent or more, based on the total weight of the one or more polymers.

11. The composite material of claim 10, wherein the one or more high viscosity polymers includes a polymer having a melt flow rate of about 0.5 g/10 min or less.

12. The composite material of claim 11, wherein the one or more high viscosity polymers includes a polyolefin elastomer that is a copolymer of ethylene and octene having a density of about 0.868 g/cm³.

13. The composite material of claim 9, wherein the organic filler has a specific gravity of 0.9 to about 2.0.

14. The composite material of claim 13, wherein the concentration of the metallic fiber is about 2 volume percent or more, based on the total volume of the polymeric core layer.

15. The composite material of claim 1, wherein the metallic fiber is present in an amount of about 2 volume percent or more, based on the total volume of the polymeric core layer.

16. A composite material comprising:
i) a first steel layer having a tensile yield strength of 240 MPa or more and a thickness of about 0.55 mm or more;
ii) a second steel layer having a tensile yield strength of less than 220 MPa and a thickness of about 0.40 mm or less;
iii) a polymeric core layer interposed between and attached to the first and second steel layers;
wherein a thickness of the polymeric core layer is about 0.1 mm or more and a ratio of the thickness of the polymeric core layer to a thickness of the composite material is about 0.25 or more and about 0.90 or less;
wherein the polymeric core layer includes a polymer matrix having a melting temperature of 180° C. or more, a glass transition temperature of 180° C. or more, or a cross-linked structure that prevents flow at 180° C.; and
the polymeric core layer is characterized by an equilibrium water absorption of about 2.0 weight percent or less, as measured according to ASTM D570-98 (2018) at a temperature of about 25° C.

17. The composite material of claim 16, wherein
the first steel layer has a tensile yield strength of about 260 MPa or more;
the first steel layer has a tensile yield strength of about 1150 MPa or less; and
a ratio of the tensile yield strength of the first steel layer to the tensile yield strength of the second steel layer is from about 1.15 to about 5.0; and
the polymeric core layer is characterized by an equilibrium water absorption of about 1.0 weight percent or less, as measured according to ASTM D570-98 (2018) at a temperature of about 25° C.;
wherein the first steel layer has a chrome plating.

* * * * *